Patented Aug. 11, 1953

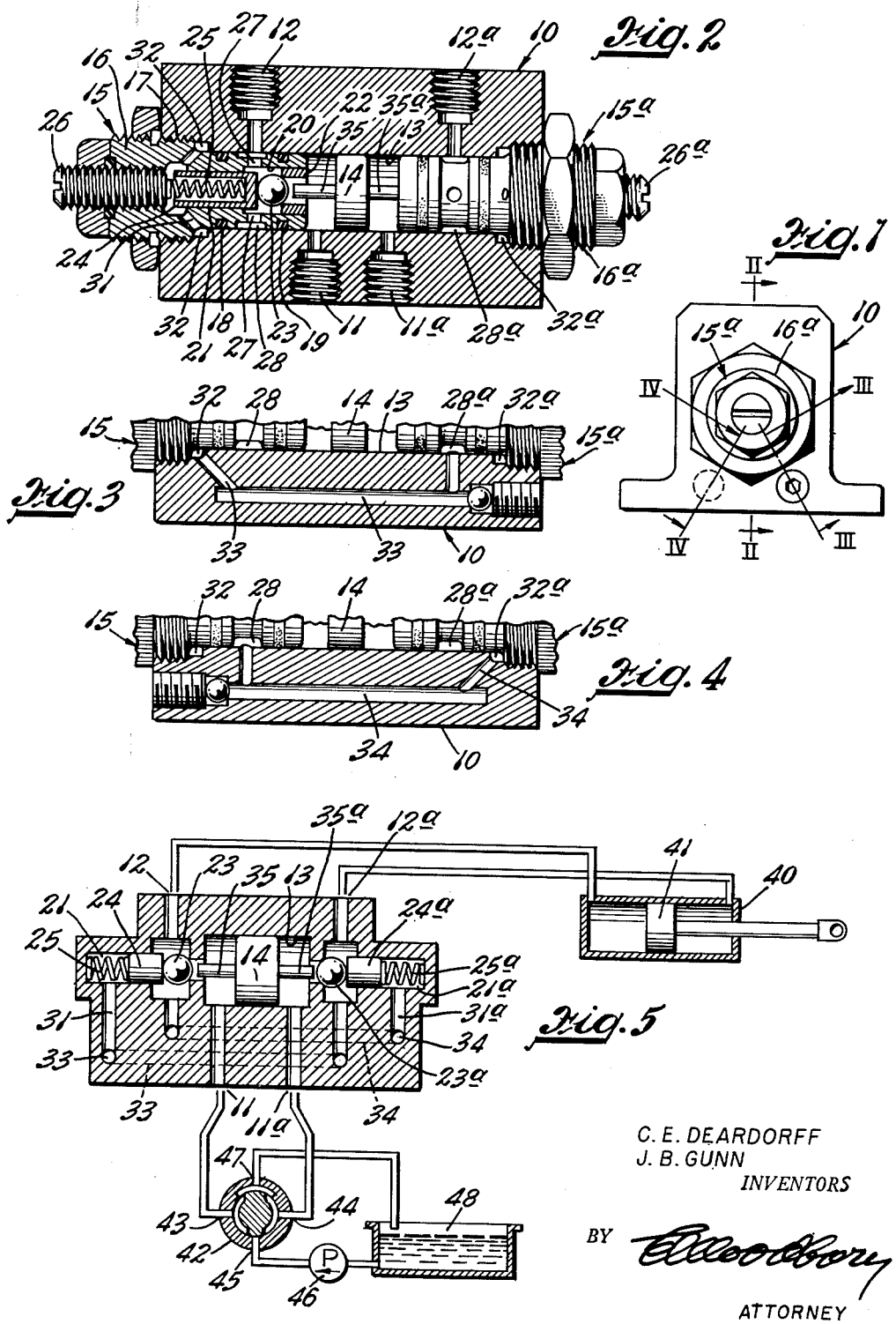

2,648,346

UNITED STATES PATENT OFFICE 2,648,346

LOCKING VALVE FOR HYDRAULIC MOTORS

Clinton E. Deardorff, San Fernando, and Joseph B. Gunn, Van Nuys, Calif., assignors to Bendix Aviation Corporation, North Hollywood, Calif., a corporation of Delaware Application May 19, 1952, Serial No. 288,738

3 Claims. (Cl. 137—102)

This invention relates to locking valves such as are frequently interposed between a selector valve and a hydraulic motor controlled thereby, for locking the motor against movement when the selector valve is in neutral position.

Such valves as previously constructed prevent escape of fluid from the motor but do not prevent entry of fluid to the motor. Under some conditions, high shock forces applied to the motor by its load cause it to compress the fluid in one line and thereby move sufficiently to draw in fluid through the other line, which fluid is then trapped by the locking valve. As a result, excessive pressures may be built up in the lines between the motor and the locking valves.

An object of the present invention is to provide a locking valve that prevents flow to a circuit controlled thereby as well as away therefrom.

Another object is to provide a valve having two line ports respectively associated with two load ports, in which pressure in either line port in excess of the pressure in its associated load port communicates each supply port with its associated load port, but in which pressure in either load port exceeding the pressure in the supply ports breaks communication between the load ports and the supply ports.

Other more specific objects and features of the invention will become apparent from the description to follow.

In the drawing:

Fig. 1 is an end elevation view of a valve incorporating the invention;

Fig. 2 is a longitudinal vertical section taken in the plane II—II of Fig. 1;

Fig. 3 is a longitudinal section taken in the plane III—III of Fig. 1;

Fig. 4 is a longitudinal section taken in the plane IV—IV of Fig. 1; and

Fig. 5 is a schematic diagram showing a system incorporating the valve of the present invention.

Referring first to Figs. 1, 2, 3, and 4, the valve therein depicted comprises a body 10 having a pair of line ports 11 and 11a and a pair of load ports 12 and 12a respectively. In operation, as will appear later, one of the load ports 12 may be connected to one end of a hydraulic motor cylinder and the other ports 12a may be connected to the other end of the motor cylinder. One of the line ports 11 may be connected to a pressure line and the other line port 11a connected to exhaust or vice versa.

The body 10 is provided with a central cylindrical bore 13 containing a reciprocable piston 14 and closed at its opposite ends by plug assemblies 15 and 15a respectively. Since the structures at opposite ends of the valves are identical, only that at the left end will be described. Corresponding elements at the other end of the valve bear the same reference numeral with the suffix "a."

The plug assembly 15 comprises a plug body 16 having threads thereon for screwing into associated threads 17 in the body 10 and having a reduced inner end portion which fits in the cylindrical bore 13 and seals therewith at longitudinal spaced points by means of the sealing rings 18 and 19 respectively. The plug body 16 has a cylindrical passage 20 extending thereinto from the right end, and has a smaller cylindrical passage 21 extending beyond the passage 20. The outer end of the passage 20 contains a valve seat 22 against which a ball poppet 23 is adapted to seat. The poppet 23 is normally urged against the seat 22 by a plunger 24 which is slidable in the cylinder 21 and is urged toward the poppet 23 by a spring 25 which is compressed between the plunger 21 and an adjusting screw 26 which is threaded into the outer end of the plug body 16.

The cylinder 20 is communicated by lateral apertures 27 with an annular groove 28 in the outer surface of the inner end portion of the plug body 16, which groove is in communication with the port 12 in the valve body 10. The left or outer end of the cylinder 21 is communicated by passages 31 in the plug body 16 with an annular space 32 defined between the plug body 16 and the valve body 10, which annular space 32 communicates with one end of a passage 33 in the body 10 (Fig. 3) the other end of which passage communicates with the annular groove 28a at the other end of the valve. Similarly, the annular space 32a at the right end of the valve is communicated through a passage 34 in the body 10 with the annular groove 28 at the left end of the valve.

The piston 14 has stems 35 and 35a projecting from opposite ends thereof, which stems are normally spaced from the poppets 23 and 23a but which engage one or the other of the poppets when the piston is moved in one direction or the other out of its mid position in the cylinder 13.

Referring now to Fig. 5 the valve may be connected between a hydraulic motor 40, shown as a cylinder containing a piston 41, and a selector valve 42 which supplies pressure fluid to one of the ports 11, 11a and connects the other to exhaust. The valve 42 is shown as having line ports 43 and 44 connected to the line ports 11 and 11a respectively, having a pressure port 45 connected to the output of a pump 46, and having an exhaust port 47 connected to a reservoir 48 which also supplies the pump 46. The valve 10 functions in the system shown in Fig. 5 as follows:

When the selector valve 42 is in neutral position, as shown, the pump port 45 is cut off and both of the line ports 43 and 44 are connected to the exhaust port 47 so that no pressure exists in the line ports 11 and 11a of the valve 12. If the selector valve 42 is rotated out of neutral position in one direction it applies pressure fluid from the pump 46 to the line port 11 while leaving the other line port 11a connected to exhaust. If the selector valve is rotated in the opposite direction out of neutral position, the pressure is applied to the line port 11a and the line port 11 is left connected to exhaust. It will be noted that with the valving arrangement shown, both of the line ports 11 and 11a are always connected to exhaust when the valve 42 is in neutral position, and one of these two ports is always connected to exhaust even though pressure fluid is applied to the other.

If it is desired to move the motor piston 41 to the right, the selector valve 42 is manipulated to apply pressure fluid to the line port 11. This fluid flows into the cylinder 13 on the left side of the piston 14 and past the check valve 23 and thence out through load port 12 to the left end of the motor 40. The pressure of this fluid in the left end of the cylinder 13 not only opens the check valve 23 directly but moves the piston 14 to the right, so that the stem 35a thereof engages the check valve 23a and opens it, thereby permitting return of fluid from the right end of the motor 40 through the load port 12a and past the check valve 23a to the line port 11a and thence through the valve 42 back to the reservoir 48. Obviously if the pressure fluid is applied to the line port 11a the check valve 23a is directly opened by the fluid and the piston 14 is moved to the left so that its stem 35 opens the other check valve 23 to permit return of fluid from the left end of the motor 40.

It will be noted that pressure fluid in the line port 11 will also be applied past the check valve 23 and through the passage 34 to the right or outer end of the cylinder 21a thereby urging the plunger 24a to the left. The force exerted on the poppet 23a by the plunger 24a is in opposition to the opening force applied to the poppet 23a by the piston 14. However the piston 14 will always prevail over the plunger 24a because of its substantially larger area.

When the selector valve 42 is restored to neutral position, after an operation as described above, the pressure in the line ports 11 and 11a is reduced to a very low value, but pressure remains in the opposite ends of the motor 40 because they are then cut off from the line ports 11 and 11a by the closing of the check valves 23 and 23a. It will be observed that if the pressure tends to increase in either of the load ports 12 or 12a it will force the check valve 23 or 23a even more tightly against its seat, so that there is no tendency for leakage of fluid from the motor 40 back through the valve 10 to the line ports 11 and 11a.

However, with valves of this type, as previously constructed, if powerful reaction forces are applied to the motor piston 41, suction forces can be developed in one or the other of the load ports 12 or 12a which would draw in additional fluid past one of the check poppets 23 or 23a. Thus let it be assumed that a powerful force is applied to the motor piston 41 urging it to the right. This tends to force fluid out of the right end of the motor 40 and through the load port 12a and past the check valve 23a. As previously noted, such flow cannot occur, but there may be some compression of the fluid in the ducts and passages or some expansion of the ducts which would permit the piston 41 to move a short distance in response to the force. This movement would reduce the pressure in the left end of the motor 40 and in the load port 12 tending to draw in additional fluid past the poppet 23. As a result of this action it has been found in practice that with locking valves as previously known, powerful alternating forces applied to the motor piston 41 would pump fluid into one or both ends of the motor 40 developing high and dangerous pressures in the motor and the lines between the motor and the valve 10.

Such pumping and generation of high pressures is prevented by the present invention because a high pressure, for instance in the load port 12a, is applied through the passage 33 and the passages 32 and 31 to the left end of the plunger 24, thereby urging that plunger powerfully to the right and hold the poppet 23 against its seat despite the existence of a low pressure in the load port 12.

Similarly the poppet 23a is prevented from opening in response to low pressure in the load port 12a, because simultaneously the high pressure existing in the port 12 is applied through the passage 34 to the right end of the plunger 24a which holds the poppet 23a tightly against its seat.

It will be observed therefore that the locking valve of the present invention is locking in the full sense of the word, since when pressure is absent from the line ports 11 and 11a, the pressure in either of the load ports 12 or 12a locks both of the poppets 23 and 23a tightly against their seats, preventing any flow of fluid either in or out of the load ports 12 or 12a.

Although for the purpose of explaining the invention, a particular embodiment thereof has been shown and described, obvious modifications will occur to a person skilled in the art, and we do not desire to be limited to the exact details shown and described.

We claim:

1. A valve of the type described comprising: a body having two line ports and two load ports; means defining two flow paths one between one line port and one load port and the other between the other line port and the other load port; a check valve in each flow path directed to prevent flow from each load port to its associated line port; first motor means responsive to pressure in either line port to open the check valve associated with the other line port; and second motor means differentially responsive to the pressures in said two load ports for urging into closed position the check valve associated with the load port of lower pressure.

2. A valve in accordance with claim 1 in which said second motor means comprises two motors respectively associated with and adjacent to said two check valves; means connecting each motor between said two load ports each motor being movable against its associated check valve to urge it into closed position in response to pressure in the load port associated with the other check valve.

3. A valve according to claim 2 in which each of said check valves comprises a seat and a poppet and each of said two motors of said second motor means comprises a cylinder aligned with its associated poppet on the side thereof remote from the seat and a plunger in said cylinder movable against the poppet to urge it against the seat; the end of said cylinder adjacent said poppet communicating directly with the associated load port; and passage means connecting the other end of the cylinder to the other load port.

CLINTON E. DEARDORFF.
JOSEPH B. GUNN.

References Cited in the file of this patent

UNITED STATES PATENTS

| Number | Name | Date |
|---|---|---|
| 2,389,654 | Van Der Werf | Nov. 27, 1945 |
| 2,483,312 | Clay | Sept. 27, 1949 |
| 2,621,676 | Loft | Dec. 16, 1952 |